United States Patent Office 3,801,592
Patented Apr. 2, 1974

---

3,801,592
4-HYDROXY-1-PHENYL-2-PYRROLIDINO-PENTANE AND SALTS THEREOF
Ernst Seeger, Joachim Kahling, and Wolfhard Engel, Biberach an der Riss, Germany, assignors to Boehringer Ingelheim GmbH, Ingelheim am Rhein, Germany
No Drawing. Filed Mar. 27, 1972, Ser. No. 238,660
Claims priority, application Germany, Mar. 30, 1971,
P 21 15 281.8
Int. Cl. C07d 27/04
U.S. Cl. 260—326.5 R  2 Claims

ABSTRACT OF THE DISCLOSURE

Mixtures of diastereoisomers of 4-hydroxy-1-phenyl-2-pyrrolidino-pentane of the formula

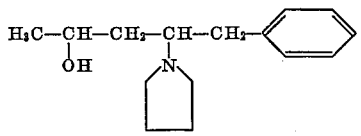

individual diastereomeric isomer components of said mixture, and non-toxic acid addition salts thereof; the compounds are useful as central nervous system stimulants.

---

This invention relates to mixtures of diastereoisomers of the novel compound 4-hydroxy-1-phenyl-2-pyrrolidino-pentane, the individual diastereomeric isomer components of the mixture, and non-toxic acid addition salts thereof, as well as to a process for preparing these compounds.

More particularly, the present invention relates to diastereomeric mixtures of the compound of the formula

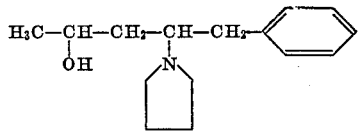
(I)

the individual diastereomeric isomer components of such mixtures, and non-toxic, pharmacologically acceptable acid addition salts of said mixtures or individual isomers.

The compound of the Formula I above may be prepared by reacting 4-hydroxy-2-pyrrolidino-butyronitrile of the formula

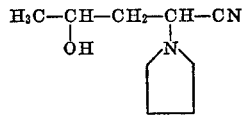
(II)

with a Grignard reagent of the formula

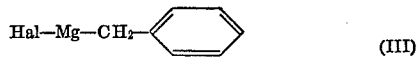
(III)

wherein Hal is halogen, preferably chlorine or bromine, at a temperature between −20° C. and +50° C., preferably between 10 and 15° C., and in the presence of a solvent medium suitable for Grignard reactions, such as ether, dioxane, tetrahydrofuran or mixtures of two or more of these, or also in the presence of benzene.

After completion of the reaction, the reaction mixture is decomposed in the cold with an acid, such as hydrochloric acid or acetic acid, or with ammonium chloride in the presence of water, and then worked up after addition of a base, such as ammonia.

If the above-described reaction yields a mixture of diastereoisomers of the compound of the Formula I, which is always the case when a mixture of diastereoisomers of the compound of the Formula II is used as the starting material, the reaction product may, if desired, be separated into its individual diastereoisomeric isomer components by physical separation procedures, such as by fractional crystallization of their acid addition salts, especially their hydrochlorides, or by chromatography.

The starting compound of the Formula II may, for example, be prepared by first reducing 3-oxo-butyraldehyde-dimethylacetal with a complex hydride, especially with sodium borohydride, to form 3-hydroxy-butyraldehyde-dimethylacetal, and reacting the latter with pyrrolidine hydrochloride and potassium cyanide at room temperature.

The diastereoisomeric mixtures of the compound of the Formula I, as well as the individual diastereoisomeric isomer components thereof, are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, fumaric acid, tartaric acid, citric acid, 8-chlorotheophylline or the like.

The following examples further illustrate the present invention and will enable others skilled in the art to understand it more completely. It should be understood, however, that the invention is not limited solely to the particular examples given below.

PREPARATION OF STARTING COMPOUND OF THE FORMULA II

Example A (a) 3-hydroxy-butyraldehyde - dimethylacetal.—22.8 gm. of sodium borohydride were added in small portions over a period of 5 hours to a mixture of 79.2 gm. of 3-oxo-butyraldehyde-dimethylacetal and 450 ml. of methanol at 30–40° C., accompanied by stirring, and the reaction mixture was then allowed to stand for ten hours at room temperature. Thereafter, the major amount of the methanol was distilled off, the residue was admixed with 750 ml. of water, the resulting aqueous soluiton was saturated with sodium chloride, and the resulting mixture was extracted several times with ether. The combined ether extract solutions were dried over sodium sulfate and then completely freed from methanol by evaporation. The residue was distilled in vacuo, yielding 60 gm. of the acetal as a colorless liquid having a boiling point of 70–72° C. at 12 mm. Hg.

(b) 4-hydroxy - 2 - pyrrolidino-butyronitrile.—While cooling, 28.8 gm. of pyrrolidine were neutralized with the calculated amount of concentrated hydrochloric acid, and then additional hydrochloric acid was added until the mixture had a pH of about 4. At this point 53.2 gm. of 3-hydroxy-butyraldehyde-dimethylacetal were added dropwise, the resulting mixture was stirred at room temperature for 90 minutes, and then a solution of 26 gm. of potassium cyanide in a small amount of water was added while cooling at 20° C. The reaction mixture was stirred for one hour at room temperature, thereafter diluted with 200 ml. of water, and the aqueous solution was extracted with ether. The ether extract solution was washed with water and then extracted twice with aqueous 10% hydrochloric acid. The combined acid aqueous extracts were made alkaline with aqueous ammonia, the oil precipitated thereby was taken up in ether, the resulting ethereal solution was dried over sodium sulfate, and the ether was evaporated, leaving 18 gm. of 4-hydroxy-2-pyrrolidino-butyronitrile as a yellowish liquid having a boiling point of 80–82° C. at 0.1 mm. Hg.

PREPARATION OF END PRODUCT OF THE FORMULA I

Example 1

Mixture of diastereoisomers of 4 - hydroxy - 1 - phenyl - 2 - pyrrolidino - pentane.—A solution of 17.9 gm. of 4 - hydroxy - 2 - pyrrolidinobutyronitrile in 300 ml. of absolute ether was added dropwise to a Grignard reagent solution, prepared in conventional manner from 5.61 gm. of magnesium powder and 35.25 gm. of benzyl chloride in absolute ether, at 10 to 15° C. while stirring, and the resulting mixture was refluxed for two hours. Thereafter, the reaction mixture was poured over ice, and the aqueous mixture was acidified with dilute hydrochloric acid. The resulting aqueous, acidic solution was made alkaline with ammonia, the oil precipitated thereby was extracted with ether, and the ether was evaporated from the extract solution. The residue was fractionally distilled in vacuo, yielding 12 gm. of a yellowish liquid having a boiling point of 112–115° C. at 0.05 mm. Hg which was identified to be a mixture of diastereoisomers of 4-hydroxy-1-phenyl-2-pyrrolidinopentane.

Example 2

Separation of diastereoisomeric mixture of 4-hydroxy-1-phenyl-2-pyrrolidino-pentane into individual isomer components.—The mixture of diastereoisomers of 4-hydroxy-1-phenyl-2-pyrrolidino-pentane obtained in Example 1 was dissolved in acetone, and the solution was admixed with a solution of gaseous hydrogen chloride in ether until the mixture had a pH of 7.5, whereby the hydrochloride of one isomer (A), M.P. 172–173° C., precipitated out, which was collected by vacuum filtration.

The filtrate was evaporated, the residue was admixed with aqueous ammonia, the oily precipitate formed thereby was extracted with ether, the ether was evaporated from the extract solution, and the residue was distilled. The distillate was dissolved in acetone, and the resulting solution was admixed with a solution of gaseous hydrogen chloride in ether until the mixture had a pH of 7, whereby the hydrochloride of the other isomer (B) precipitated out. The precipitate was collected by vacuum filtration and recrystallized from acetone, whereupon it had a melting point of 126–127° C.

The base liberated from the hydrochloride of the isomer (A) by the addition of ammonia was recrystallized from petroleum ether, M.P. 47° C.

From the free base of the isomer (A) the following salts were prepared: phosphate: M.P. 196–197° C.; sulfate: M.P. 154–156° C.; fumarate: M.P. 167–168° C.

The compounds according to the present invention, that is, mixtures of diastereoisomers of 4-hydroxy-1-phenyl-2-pyrrolidino-pentane, as well as the individual isomer components of said mixture, and the non-toxic acid addition salts of such diastereoisomeric mixtures or individual isomer components, have useful pharmacodynamic properties. More particularly, the compounds of the instant invention exhibit very effective central nervous system stimulating activities and very low toxicities in warm-blooded animals, such as mice.

For instance, isomer component A obtained in accordance with Example 2 has a significantly greater CNS-stimulating activity and is significantly less toxic than the known related compound, 1-phenyl-2-pyrrolidino-pentane.

The CNS-stimulating activity of the compounds of the instant invention was measured in mice in terms of the increase in the motility of the test animals by means of a modification of the standard test method of Friebel, sommer and Varadan, Arzneimittelforschung 9, 126 (1959).

Groups of five treated female laboratory mice each were placed into a so-called photocell activity cage for three 15-minute periods, i.e. 30 to 45, 90 to 105 and 150 to 165 minutes after peroral administration of the test compound; the cage had a glass floor with 10 upwardly directed photoelectric cells mounted beneath the floor and a downwardly directed source of light mounted above the open-top cage. The movements of the mice over the glass floor caused interruptions of the flow of light to the photoelectric cells, which were registered and counted by means of a conventional counting relay.

Isomer A obtained in Example 2 and 1-phenyl-2-pyrrolidino-pentane, hereinafter referred to as compound A and compound C, respectively, were perorally administered at varying dosage levels in solution in an aqueous 0.9% sodium chloride solution. Control groups received only an aqueous 0.9% sodium chloride solution, also perorally.

The control tests as well as the tests with the treated animals were repeated four times, using separate groups of test animals. The results described below were statistically determined from the raw test data by linear regression analysis, linear covariance analysis and calculation of the relative activity.

It was found that 100% increase in the motility over the control group during the first observation period was achieved with 9 mgm./kg. of compound A and with 25 mgm./kg. of compound C; during the second observation period a 100% increase in the motility over the controls was achieved with 11 mgm./kg. of compound A and with >25 mgm./kg. of compound C. During the third observation period neither of the test compounds increased the motility to double that of the controls.

The test results showed that there is a provable positive linear regression between the logarithm of the dose and the motility; thus similar dose-activity relationships exist for both compounds. For this reason it was easy to determine the relative activity of compound A in relation to compound C; it was found to be the following:

| Observation period min. | Relative activity of A vs. C | Confidence limits |
| --- | --- | --- |
| 30–45 | 2.10 | (1.45–3.05) |
| 90–105 | 2.38 | (1.52–3.99) |
| 150–165 | 1.72 | (0.95–2.81) |

The acute toxicity ($LD_{50}$) of the compounds according to the present invention was determined by oral administration with the aid of an esophageal sound to groups of 5 female and 5 male adult laboratory mice per dose, followed by an observation period of 14 days. The raw data were statistically evaluated by the method of Wilcoxon and Litchfield, J. Pharmacol. exp. Therap. 96, 99 (1949). Compound A was found to be significantly less toxic than compound C; the $LD_{50}$ of compound A is 390 mgm./kg., whereas the $LD_{50}$ of compound C is 198 mgm./kg.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective CNS-stimulating dosage unit of the compounds according to the present invention is from 0.083 to 1.67 mgm./kg. body weight, preferably 0.16 to 0.5 mgm./kg. body weight.

The following examples illustrate a few pharmaceutical dosage unit compositions comprising a compound of the present invention as an active ingredient and represent the best modes contemplated of putting the invention into practical use. The parts are parts by weight unless otherwise specified.

Example 3

Tablets.—The tablet composition is compounded from the following ingredients:

|  | Parts |
| --- | --- |
| 4-hydroxy-1-phenyl-2-pyrrolidino-pentane hydrochloride | 10.0 |
| Lactose | 38.0 |
| Potato starch | 46.0 |
| Polyvinylpyrrolidone | 5.0 |
| Magnesium stearate | 1.0 |
| Total | 100.0 |

Preparation: The pentane derivative is intimately admixed with the lactose and the potato starch, the mixture is moistened with an ethanolic 20% solution of the polyvinylpyrrolidone, the moist mass is forced through a 1.5 mm.-mesh screen, the resulting granulate is dried at 45° C. and again passed through a 1.0 mm.-mesh screen, the dry granulate is admixed with the magnesium stearate, and the composition is compressed into 100 mgm.-tablets in a conventional tablet making machine. Each tablet contains 10 mgm. of the pentane derivative and is an oral dosage unit composition with effective CNS-stimulating action.

Example 4

Coated pills.—The pill core composition is compounded from the following ingredients:

|  | Parts |
| --- | --- |
| 4-hydroxy-1-phenyl-2-pyrrolidino-pentane hydrochloride | 15.0 |
| Lactose | 14.0 |
| Corn starch | 8.0 |
| Polyvinylpyrrolidone | 2.5 |
| Magnesium stearate | 0.5 |
| Total | 40.0 |

Preparation: The pentane derivative is intimately admixed with the lactose and the corn starch, the mixture is moistened with an ethanolic 20% solution of the polyvinylpyrrolidone, the moist mass is forced through a 1.5 mm.-mesh screen, the resulting granulate is dried at 45° C. and again passed through a 1.0 mm.-mesh screen, the dry granulate is admixed with the magnesium stearate, and the composition is compressed into 40 mgm.-pill cores which are subsequently coated with a thin shell consisting essentially of a mixture of sugar and talcum and finally polished with beeswax. Each coated pill contains 15 mgm. of the pentane derivative and is an oral dosage unit composition with effective CNS-stimulating action.

Example 5

Hypodermic solution.—The solution is compounded from the following ingredients:

|  | Parts |
| --- | --- |
| 4-hydroxy-1-phenyl-2-pyrrolidino-pentane hydrochloride | 10.0 |
| Polyethyleneglycol 600 | 100.0 |
| Distilled water (by vol.) | Q.s. ad 2000.0 |

Preparation: The polyethyleneglycol and the pentane derivative are dissolved in a sufficient amount of distilled water which had previously been boiled in an atmosphere of nitrogen, the dissolution being also carried out in an atmosphere of nitrogen. The resulting solution is then diluted to the indicated volume with additional distilled water which had also been boiled in an atmosphere of nitrogen. All of these steps must be carried out in diffused light. The finished solution is filled into brown 2 cc.-ampules, again in an atmosphere of nitrogen, and the filled ampules are sterilized for 20 minutes at 120° C. and sealed. Each ampule contains 10 mgm. of the pentane derivative, and the contents thereof are an injectable dosage unit composition with effective CNS-stimulating action.

Example 6

Drop solution.—The solution is compounded from the following ingredients:

|  | Parts |
| --- | --- |
| 4-hydroxy-1-phenyl-2-pyrrolidino-pentane hydrochloride | 10.0 |
| Case sugar | 350.0 |
| Sorbic acid | 1.0 |
| Essence of cocoa | 50.0 |
| Ethanol (by vol.) | 0.2 |
| Polyethyleneglycol 600 | 0.1 |
| Distilled water (by vol.) | Q.s. ad 1000.0 |

Preparation: The sorbic acid is dissolved in the ethanol, an equal volume of distilled water is added to the solution, and the pentane derivative is dissolved therein (solution A). The cane suger is dissolved in the remaining amount of water (solution B). The polyethyleneglycol, the essence of cocoa and solution B are stirred into solution A, and the mixed solution is filtered. The entire procedure must be carried out in an atmosphere of nitrogen and in diffused light, and the composition must be stored in brown bottles. Each 1 ml. of the finished solution (about 20 drops) contains 10 mgm. of the pentane derivative and is an oral dosage unit composition with effective CNS-stimulating action.

The amount of active ingredients in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A mixture of diastereoisomers of the compound of the formula

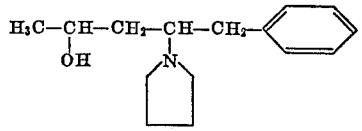

a diastereomeric isomer component of said mixture, or a non-toxic, pharmacologically acceptable acid addition salt of said mixture or said isomer.

2. A compound according to claim 1, which is 4-hydroxy-1-phenyl-2-pyrrolidino-pentane of the melting point of 47° C. and its pharmacologically acceptable acid addition salts.

References Cited

UNITED STATES PATENTS 3,121,087   2/1964   Berg _____ 260—326.5 XR

OTHER REFERENCES

Brienne et al., Chem-Abs., vol. 71; 80540e (1969), abs. of Bull. Soc. Chim. Tr., 1969, 2395–407.

JOSEPH A. NARCAVAGE, Primary Examiner

U.S. Cl. X.R.

424—274.